United States Patent [19]

Pierrel

[11] Patent Number: 4,560,841
[45] Date of Patent: Dec. 24, 1985

[54] TELEPHONE STATION WHICH IS MAIN OR REMOTELY SUPPLIED

[75] Inventor: Hans-Joachim Pierrel, Mering, Fed. Rep. of Germany

[73] Assignee: Siemens Aktiengesellschaft, Berlin & Munich, Fed. Rep. of Germany

[21] Appl. No.: 644,078

[22] Filed: Aug. 24, 1984

[30] Foreign Application Priority Data

Sep. 19, 1983 [DE] Fed. Rep. of Germany ....... 3333791

[51] Int. Cl.⁴ ............................................ H04M 19/08
[52] U.S. Cl. ..................................... 179/81 R; 179/77
[58] Field of Search ................... 179/81 R, 2 BC, 77, 179/16 A; 307/64, 66, 87

[56] References Cited

U.S. PATENT DOCUMENTS 4,197,425  4/1980  Secrett et al. ..................... 179/2 BC Primary Examiner—James L. Dwyer
Attorney, Agent, or Firm—Mark H. Jay

[57] ABSTRACT

The invention relates to a circuit for a telephone station which is mains-supplied or remote-powered as required, i.e. in the event of a mains failure an automatic switchover from the mains voltage to remote power takes place, and a switchover in the opposite direction takes place when power is restored. This is effected without any additional voltage insulation and without substantial additional expense.

This is achieved in that a switching regulator which establishes the actual feed voltage is connected to the mains DC voltage, where a blocking voltage for a transistor located in the remote feed unit is obtained from the mains DC voltage. If the mains fails, the blocking voltage for the transistor is also lost and the latter is switched through by the remote feed voltage which acts upon its base. This procedure is automatically reversed when the main voltage again becomes available.

1 Claim, 1 Drawing Figure

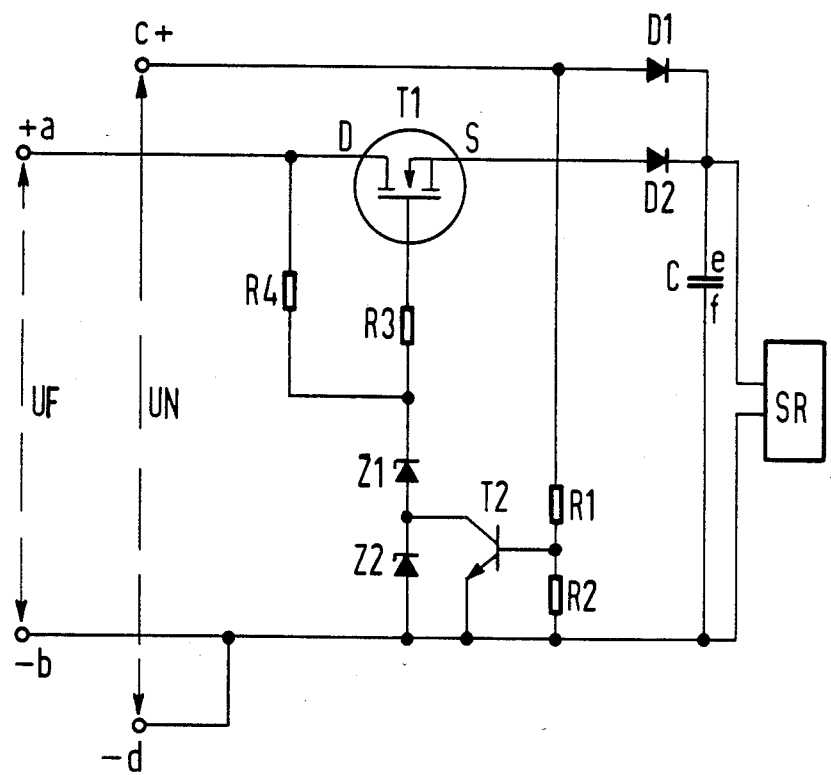

TELEPHONE STATION WHICH IS MAIN OR REMOTELY SUPPLIED

BACKGROUND OF THE INVENTION

The invention relates to a circuit for a telephone station which is main-supplied or remote-powered as necessary, and where a switching regulator is provided, which at its output supplies a constant supply voltage and at its input is bridged by a buffer capacitor.

Telephone stations are generally remote-powered by the telephone exchange via the subscriber line (a/b wire). In the case of telephone stations of luxury design (generally speaking telecommunications terminals) the numerous subscriber services and the display thereof increases power consumption so that power supply via the subscriber line is uneconomical. This applies particularly in the case of long connection distances. Therefore for telephone stations of this kind stationary power supply devices have been provided, to satisfy the higher power requirements of such stations.

However, power supply devices of this kind have the disadvantage that they are dependent upon the electrical mains. In the event of a power failure, telephone operation would be impossible. Therefore it is necessary in the case of a mains failure, to switch over to remote power, thereby disconnecting larger power consumers in the terminal. It is unfeasable for such a switchover to be manually carried out. A simple switchover circuit linking the two voltage sources to the statiobn via diodes is likewise inexpedient, since power supply via the power supply device should take precedence and therefore the power supply device output voltage must be higher than the DC voltage across the subscriber line. Since this DC voltage is limited to at most 72 V in the case of short connections, in this case the power supply device requires an increased contact protection and therefore becomes too expensive. On the other hand the conversion of a lower power supply device voltage into a higher DC voltage necessitates an additional DC voltage converter and increased space requirements in the terminal and an increased interference level is likely.

Therefore one object of the invention is to provide a simple circuit arrangement with which it is possible to effect an automatic switchover from mains supply to remote power in the event, for example, of a mains failure, which involves neither substantial space requirements, nor increased insulation, nor additional expense for parts.

This is achieved in that the first terminal of the buffer capacitor is connected via a first diode, which is biased in the flux direction, to the positive pole of a power supply device, is connected via a second diode, biased in the flux direction, and via the drain source path of a first transistor (MOS-transistor) to the positive pole of the remote feed, and is connected via the first diode and via two series-connected resistors to the negative poles of remote feed and power supply device and to its other terminal, that moreover the base of the first transistor is connected via the series arrangement of a third resistor, a first and a second Zener diode to the negative poles, and is connected via the third resistor and a fourth resistor to the positive pole of the remote feed, and that a second transistor is connected by its base to the common point of the series-connected resistors, is connected by its collector to the common point of the Zener diodes, and is connected by its emitter to the negative poles.

This has the advantage that is is easily possible in telephone stations as described above to switch over from the power supply device to remote power (for example if the mains fail) and vice versa economically and without the assistance of the operator.

BRIEF DESCRIPTION OF THE DRAWING

An exemplary and non-limiting preferred embodiment of the invention is shown in the drawing, which shows a schematic diagram of the preferred embodiment of the invention.

DETAILED DESCRIPTION OF THE PREFERRED EMBODIMENT

The drawing shows a switching regulator SR, a buffer capacitor C, two decoupling diodes D1 and D2, a voltage divider composed of the resistors R1 and R2, a MOS field effect transistor T1, a transistor T2, a series resistor R3, a resistor R4, two Zener diodes Z1 and Z2, the subscriber line terminals a/b and the power supply device terminals c/d.

In the case of telephone stations or terminals having a relatively high power requirement, the DC voltage supply is normally provided from the stationary power supply device. In the drawing this power supply device will be assumed to deliver a DC voltage UN across points c(+) and d(−). This voltage UN is connected on the one hand via the decoupling diode D1 to the plate e of the buffer capacitor C and on the other hand to the plate f of the buffer capacitor C. It is across plates e and f that the switching regulator SR obtains its input voltage from which it forms the feed voltages necessary for the actual station circuit and produces these in a manner not shown.

The voltage UN is also connected to a voltage divider which consists of the resistors R1 and R2. The two resistors R1 and R2 are chosen such that at their common point during mains operation there is enough voltage at the base of the transistor T2 to turn the transistor T2 on. In its conductive state, the collector-emitter circuit of the transistor T2 bridges across the Zener diode Z2.

The remote feed unit (UF) which is connected at the points a and b—i.e. via the subscriber line—can now produce a voltage drop for the base of the MOS-transistor T1 only across the Zener diode Z1; the current path goes through T2, Z1, R4 and bypasses Z2. The voltage drop across the series protective resistor R3 is negligible. The voltage drop across the Zener diode Z1 is insufficient to render the drain-source path (DS) of the transistor T1 fully conductive. Consequently the anode of the diode D2 is connected to a less positive voltage than its cathode (+c less the voltage drop across D1) and the diode D2 is nonconductive. As a result the remote feed unit UF is disconnected from any load (with the exception of the negligible current through T2, Z1 and R4) and the telephone station is fed from the stationary power supply device.

If power is lost because the power supply device breaks down or the mains fail, the base current for the transistor T2 is lost and transistor T2 is turned off. Consequently the Zener diode Z2 is no longer bridged and the voltage at the gate of transistor T1 is high enough to turn the transistor T1 on. Now by means of the constantly connected remote feed voltage UF, the voltage at the source S of the transistor T1 is controlled by the two Zener diodes. At the same time this source voltage (across S) is limited by the two Zener diodes in such manner that their maximum value is not excessive for commercially available integrated switching regulators. In the case of short subscriber lines and thus a high connected voltage UF, the transistor T1 in combination with the Zener diodes Z1 and Z2 acts as a regulated current source.

Since the voltage at the anode of the diode D2 is now more positive than that at its cathode, the diode D2 is conductive and the switching regulator SR obtains its input voltage via the transistor T1 and the diode D2, i.e. from the capacitor C which is charged via line a, T1, D2 and line b. If the power supply device were reconnected in this state, the above described state would re-occur, i.e. the transistor T2 would bridge the Zener diode Z2, the voltage at source S would drop and the diode D2 would turn off. The telephone station is thus again automatically fed from the power supply device and the remote feed unit UF is disconnected from load.

The circuit arrangement in accordance with the invention easily enables a telephone station to be switched over between mains supply and remote power when required, automatically and without any substantial cost.

Those skilled in the art will understand that changes can be made in the preferred embodiment here described, and that this embodiment can be used for other purposes. Such changes and uses are within the scope of the invention, which is limited only by the claims which follow.

What is claimed is:

1. A circuit for changing as required the power supply of a telephone station between electrical mains and a remote source which is placed across a subscriber line, the station having a switching regulator with an output for delivering a constant voltage to the station and an input bridged by a buffer capacitor having first and second plates, comprising:
    a forward-biased first diode connected between the first plate and a positive side of a DC power supply device fed by electrical mains;
    a field effect transistor having its drain-source circuit connected to a positive side of the subscriber line;
    a forward-biased second diode connected between the drain-source circuit of the field effect transistor and the first plate;
    a two resistor, series-connected voltage divider connected between the positive side of the DC power supply device and a negative side thereof, the voltage divider having a common point between its two resistors and being connected at its negative end to the second plate of the buffer capacitor and negative sides of the DC power supply device and the subscriber line;
    a series network containing a resistor and first and second Zener diodes, the resistor being connected between the gate of the field effect transistor and the first Zener diode, the first Zener diode being connected between the resistor and the second Zener diode, and the second Zener diode being connected between the first Zener diode and said negative sides of said device and line;
    a fourth resistor connected between the gate of the field-effect transistor and the positive side of the subscriber line; and
    a second transistor having its base connected to said common point between said first and second resistors, its emitter connected to said negative sides of said device and line, and its collector connected to a common point between the first and second Zener diodes.

* * * * *